Nov. 4, 1952

R. A. MILLER 2,616,622

TAXIMETER CASING AND SUPPORT

Filed Oct. 20, 1948

Ralph A. Miller, INVENTOR.
BY Dybvig & Dybvig
His Attorneys.

Patented Nov. 4, 1952

2,616,622

UNITED STATES PATENT OFFICE 2,616,622

TAXIMETER CASING AND SUPPORT

Ralph A. Miller, Dayton, Ohio, assignor, by mesne assignments, to The Dayton Taximeter Co., a corporation of Ohio Application October 20, 1948, Serial No. 55,638

2 Claims. (Cl. 235—30)

This invention relates to a taximeter and more particularly to an improved arrangement for housing and mounting the meter mechanism.

It is an object of this invention to provide an improved arrangement which makes it possible to mount the meter directly on the dashboard of an automobile without the necessity of drilling any holes or otherwise marring the dashboard.

Another object of this invention is to provide a mounting arrangement for a meter which does not take up valuable space.

Still another object of this invention is to provide an improved arrangement for mounting a meter within the driver's compartment of the cab in such a location that the meter may be easily read by both the driver and the occupants.

A further object of this invention is to provide an improved mounting arrangement for a meter which makes it impossible for the operator of the cab to disconnect the cable from the meter or otherwise tamper with the meter.

Another object of this invention is to provide a meter mounting and housing arrangement which makes it possible to repair the meter with a minimum amount of inconvenience.

Other objects and advantages reside in the construction of parts, the combination thereof and the mode of operation, as will become more apparent from the following description.

Figure 1:
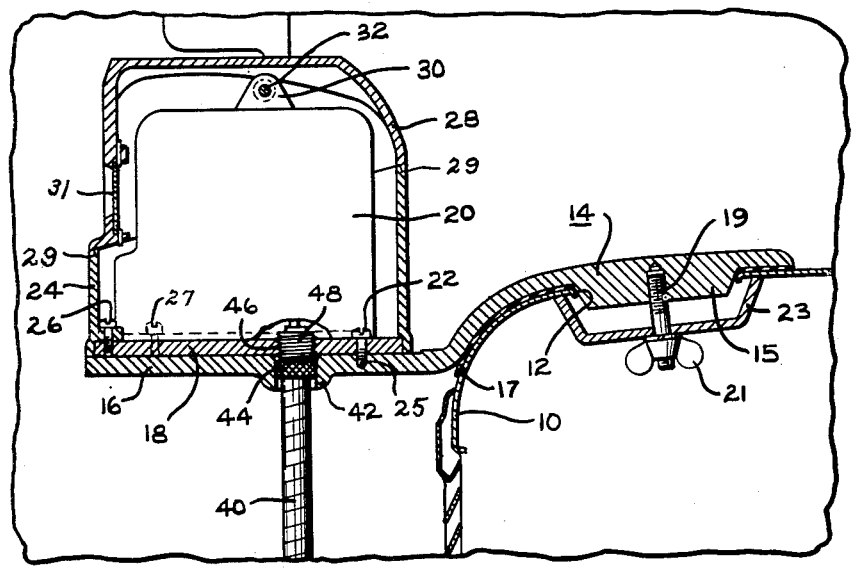
Figure 1 is a vertical sectional view showing the relationship between the meter housing, the meter mounting bracket and the dashboard of a car.
Figure 2:
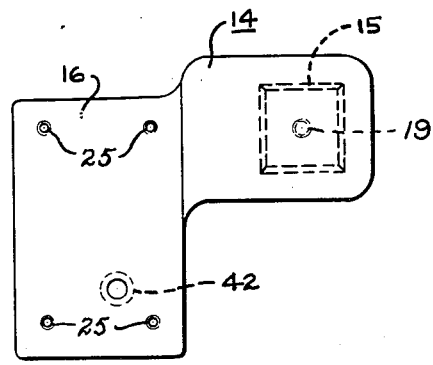
Figure 2 is a plan view of the mounting bracket with the meter housing removed.
Figure 3:
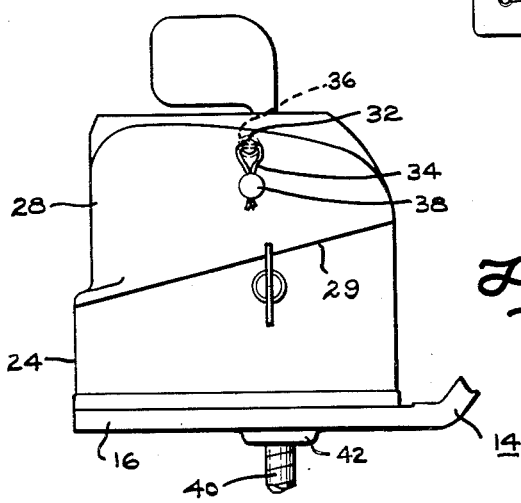
Figure 3 is an end elevational view showing the meter housing attached to one of the mounting brackets.

Referring now to the drawing wherein I have shown a preferred embodiment of my invention, reference numeral 10 designates the dashboard of a conventional car of a type commonly used by cab companies. Reference numeral 12 designates the ash tray opening which is typical of those normally provided in the dashboard of all standard makes of cars and which is used to advantage in supporting the meter mounting bracket in place within the driver's compartment of the cab.

The meter is supported within the driver's compartment by means of the bracket 14. A projecting boss 15 is provided in the bracket 14 which closely fits into the ash tray opening 12 provided in the dashboard. A gasket 17 is provided between the dashboard and the bracket 14 so as to prevent any injury to the dashboard. The projection 15 is held in place within the ash tray opening by means of a threaded stud 19 secured to the projection 15 and a U-shaped element 23 which is forced against the rear face of the dashboard 10 by means of a thumb nut 21. By tightening the thumb nut 21 against the element 23, it is possible to very securely fasten the mounting bracket to the dashboard.

The meter mounting bracket 14 includes a horizontal shelf portion 16 to which the base 18 of the meter mechanism 20 is secured by means of one or more cap screws 22 which are accessible only from within the meter housing section 24. The cap screws 22 engage within tapped recesses 25 provided in the shelf portion 16.

The meter mechanism may be varied without departing from the spirit of my invention and for that reason it has not been considered necessary to describe the details of construction of the meter mechanism other than to state that it is preferably of the type shown in copending application Serial Number 752,086 filed June 3, 1947. The meter is anchored to the base 18 by means of one or more cap screws 27 and includes one or more upstanding lugs or projections 30 which serve as a means for anchoring the rod 32 which holds in place the upper portion 28 of the main meter housing, as will be explained more fully hereinafter.

The meter mechanism is enclosed within a two part housing which comprises a lower section 24 bolted to the base 18 by means of one or more suitably arranged cap screws 26 which are accessible only from within the housing section 24 and an upper portion or section 28 which fits over the lower section 24 and is readily removable to give access to the meter mechanism.

The upper casing section 28 is held in place by means of a single rod 32 which passes through the end walls of the casing section 28 and one or more projecting lugs 30 provided on the meter mechanism. All of the meter mechanism is thus completely enclosed within the main meter housing, with the result that it is impossible for the cab operators to tamper with the setting of the meter without removing the casing section 28. Reference numeral 29 designates the line of juncture between the upper and lower casing sections and reference numeral 31 designates a transparent window through which the fare may be read. Unauthorized removal of the rod 32 is prevented by the use of a conventional seal which comprises a wire 34 which passes through an aperture 36 and has its ends held together by means of a conventional lead seal 38. By virtue of the above described arrangement, it is impossible for anyone to tamper with the operation of the meter or the setting of the meter without breaking the lead seal 38.

It will be observed that the cap screws 22 and 26 are inaccessible at all times when the casing section 28 is in place. It will also be observed that the flexible shaft 40, which leads to the meter, passes through an apertured boss 42 provided in the mounting bracket 16 and that the knurled nut 44, which serves to hold the flexible cable 40 in assembled relationship to the meter and the meter base 18, is inaccessible so long as the base 18 is bolted to the bracket 16. The base 18 is provided with a threaded aperture 46 within which the threaded portion 48 of the cable anchoring nut 44 is threaded. In order to disconnect the cable from the meter mechanism, it is thus necessary to first remove the casing section 28, then the casing section 24, and then the base 18, before it is possible to lift the base 18 off the bracket 16 a distance far enough to make the nut 44 accessible.

Removal of the upper casing section 28 makes it possible to adjust or repair the meter mechanism without removing the meter or even unscrewing any of the cap screws.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. In a taximeter, a meter base, means for supporting said base within the driver's compartment of a cab, a meter, means for securing said meter to said base, a housing for said meter comprising a first section having a top opening and a second section for closing said top opening, means accessible only from within said first section for attaching said first section to said base, and means for securing said second section to said first section comprising a rod passing through the sides of said second section and through a portion of said meter so as to hold said second section in assembled relationship with said first section.

2. In a taximeter, a meter base, means for supporting said base within the driver's compartment of a cab, a meter, means for securing said meter to said base, a housing for said meter comprising a first section having a top opening and a second section for closing said top opening, means accessible only from within said first section for attaching said first section to said base, means for securing said second section to said first section comprising a rod passing through the sides of said second section and through a portion of said meter so as to hold said second section in assembled relationship with said first section, and means for preventing removal of said rod by unauthorized persons.

RALPH A. MILLER.

REFERENCES CITED

The following references are of record in the file of this patent:

UNITED STATES PATENTS

| Number | Name | Date |
|---|---|---|
| 1,112,273 | Dixon et al. | Sept. 29, 1914 |
| 1,269,309 | Richard | June 11, 1918 |
| 1,275,185 | Kurouski | Aug. 6, 1918 |
| 1,464,882 | Palmer | Aug. 14, 1923 |
| 1,537,039 | Short | May 5, 1925 |
| 1,718,341 | Fausel et al. | June 25, 1929 |
| 1,899,043 | Marden | Feb. 28, 1933 |
| 1,947,937 | Hennig | Feb. 20, 1934 |
| 1,611,512 | Clemenson | Dec. 21, 1936 |
| 2,080,261 | Funk | May 11, 1937 |
| 2,121,317 | Cohen | June 21, 1938 |
| 2,251,989 | Dean | Aug. 12, 1941 |